H. R. WHITE.
TOBACCO PIPE.
APPLICATION FILED NOV. 7, 1908.
927,015.
Patented July 6, 1909.
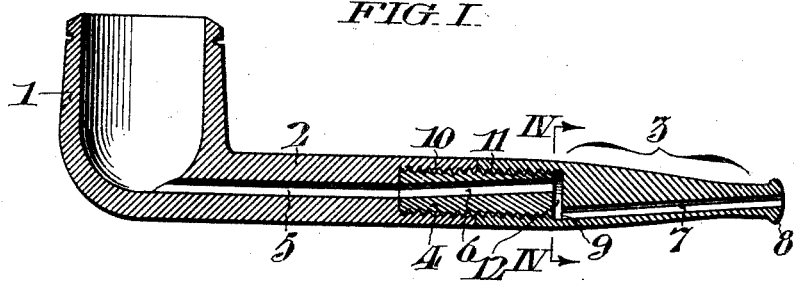
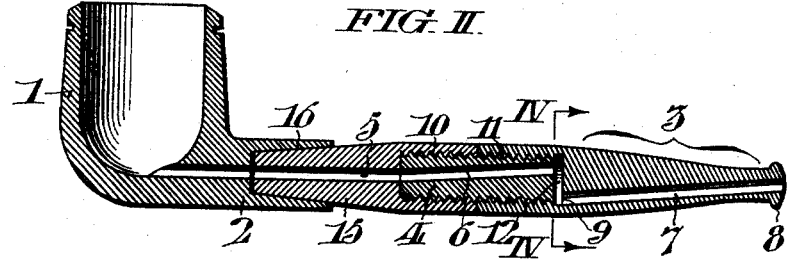
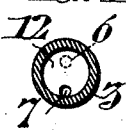
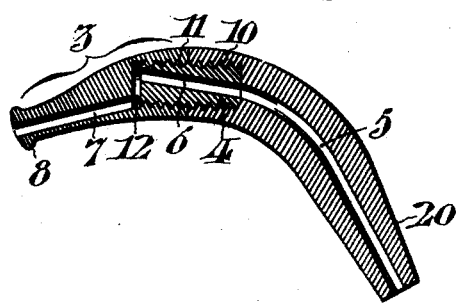
WITNESSES:
John C. Bergner.
James H. Bell.
INVENTOR:
HARRY R. WHITE,
By Riley & Paul,
Attorneys

UNITED STATES PATENT OFFICE.

HARRY R. WHITE, OF PHILADELPHIA, PENNSYLVANIA.

TOBACCO-PIPE.

No. 927,015.　　　　　Specification of Letters Patent.　　　　　Patented July 6, 1909.

Application filed November 7, 1908.　Serial No. 461,440.

*To all whom it may concern:*

Be it known that I, HARRY R. WHITE, of Philadelphia, in the county of Philadelphia and State of Pennsylvania, have invented certain new and useful Improvements in Tobacco-Pipes, whereof the following is a specification, reference being had to the accompanying drawings.

In said drawings, Figure I, represents a vertical central section through a pipe embodying my invention, the form being one in which the mouth piece is attached to the stem of the pipe bowl by means of a screw connection, ordinarily called a "screw stem". Fig. II, is a similar section through a pipe in which the connection between the mouth piece and the stem of the pipe bowl is merely a frictional one, ordinarily called a "push stem". In these instances the stem of the pipe is represented as straight. Fig. III, is a vertical section through a curved mouth piece, which may be either used as a screw stem or push stem. Fig. IV, is a transverse section through the mouth piece on the line IV, IV, of Figs. I, and II.

The object of my invention is to prevent fouling of the pipe through the accumulation and retention of saliva, etc., in the smoke duct.

Numerous devices have been suggested and employed for the general purpose of minimizing the disagreeable consequences due to the accumulation of saliva, etc., in pipe stems, but so far as I am aware, they all operate upon a principle which is directly the converse of that characterizing my invention. As heretofore constructed, such devices have provided chambers, offsets, or traps, so constructed as to receive and permanently retain the saliva, etc., the idea being to prevent the substances, thus trapped from being drawn into the mouth of the smoker at any time, and to cause them to accumulate in a definite locality, the pipe being subsequently taken apart and the trap or other retaining chamber cleaned out. On the other hand, when a mouth piece and pipe stem are provided only with straight continuous ducts, there is a very considerable accumulation of saliva, at the lowest portion, adjacent to the pipe bowl, where great contamination takes place, so that, if as the result of accumulation, a substantial quantity of the detained substances is sucked into the mouth, they are very offensive.

The principle of operation upon which my invention depends is that while the flow of saliva down to the region of the pipe bowl is prevented, its detention is only temporary and in exceedingly small quantity, its automatic removal being compelled at frequent intervals during the act of smoking, the result being that the contamination is practically insensible, and that the stem remains sweet and clean. I will now proceed to describe the construction whereby this mode of operation is effected.

Referring to Fig. I of the drawings, 1, indicates the pipe bowl, 2, the adjacent portion of the stem, usually integral therewith, and 3, the mouth piece. The latter is connected to the stem 2, by means of a threaded union piece 4, which engages with internally threaded sockets 10, and 11, formed respectively in the proximate ends of the stem 2, and mouth piece 3, as shown. The smoke duct 5, which leads from the opening of the bowl through the stem 2, communicates with an upwardly inclined duct 6, extending through the union piece 4, and terminating as shown, close to the upper edge of said union, at the end engaging in the socket 11, which latter extends slightly beyond the threaded portion, so as to form a relatively small vertical channel 12, in the mouth piece. The duct 7, of the mouth-piece leads from the center of the tip 8, in a downwardly inclined direction to a point 9, where its orifice communicates with the lowest portion of the channel 12. In the instance shown the channel 12, is circular in cross section, but it may be of any other shape, provided that it does not afford a large area in which saliva can accumulate, and that no substantial portion extends below the level of the orifice 9.

In the act of smoking, the operation of the device is as follows:—The saliva which flows down the mouth-piece is temporarily detained at the bottom of the vertical channel 12, but, owing to the small area of the passage it soon seals the orifice 9, of the duct 7, a mere drop or two sufficing for this purpose. As soon as the sealing occurs, the next whiff of smoke sucked through the pipe, forces the trapped saliva back through the mouth piece, and into the mouth of the smoker, the quantity however, being so small, and the detention being so temporary, that no disagreeable effect is produced. This action recurs from time to time in the act of smoking, and since the saliva can never accumulate in the channel 12, sufficiently to overflow down through the duct 6, and into the duct 5, of the stem, no opportunity for serious contamination is afforded.

Any nicotin or gummy substances which may condense and adhere within the ducts can of course, be cleaned from time to time by ordinary means, but the principal source of foulness in pipes is not directly due to these substances, but to the accumulation of a relatively large quantity of saliva in contact therewith, forming a liquid, or semi-liquid mass, which, when accidentally drawn into the mouth, is intensely disagreeable. Moreover, even when such foul accumulations are permanently detained in enlarged chambers, traps, or masses of absorbent material, placed in the line of communication between the pipe bowl and the mouth, they are objectionable and frequent cleaning is required. It will therefore be seen that my invention differs radically from such devices, in that I seek to compel the frequent and automatic expulsion of saliva locally detained at a point near the mouth, instead of seeking to effect its permanent retention within the stem or mouth piece, and that I accomplish this result by employing a channel, which, though abruptly diverted in a vertical direction, is uninterrupted, in the sense that no portion lies below the level of direct communication.

In the type of invention shown in Fig. II, the principle is obviously the same, the only difference being that the connection between the mouth piece and the stem of the pipe comprises a conical or tapering portion 15, on the end of the mouth piece, which fits into a correspondingly tapered opening in the end 16, of the stem, but as the construction is otherwise similar to that indicated in Fig. I, it is not deemed necessary to repeat the description thereof.

In the type shown in Fig. III, where the mouth piece is represented as curved, connection with the stem may either be made by means of the tapered portion 20, or, a screw joint may be employed, as in the instance shown in Fig. I.

Having thus described my invention, I state that I do not claim the use of an interrupted conduit, or the provision of a retaining chamber in a pipe stem, since, as I have above explained, these devices, in a broad sense, are old.

For convenience of description, I use the terms "vertical", "upwardly", and "downwardly", with relation to the general position of the parts when the pipe is held in a normal manner in the mouth of a smoker, and of course, without any restricted or narrow meaning.

I wish it to be understood that although I use the term "mouth-piece" as indicating that portion of the pipe which is most remote from the bowl and which ordinarily is detachable, and prefer to locate the vertical channel within such detachable portion of the structure, I do not desire to thereby limit my claim to such specific construction, as it is only necessary that the region of temporary retention of saliva should be relatively near to that portion of the pipe which is inserted in the mouth. Hence the term "mouth-piece", must not be understood as having any restrictive or limited meaning.

I claim:—

The combination with a pipe bowl, of a stem and mouth piece, said mouth piece and stem being provided with a duct, which is inclined downwardly from the tip, then is diverted uninterruptedly to form a vertical channel, and then leads from the upper portion of said channel to the bowl, the area of said channel at the region of its lowest extremity being relatively small, whereby a minute quantity of liquid will seal the duct at said region, substantially as set forth.

In testimony whereof, I have hereunto signed my name, at Philadelphia, Pennsylvania, this fourth day of November 1908.

HARRY R. WHITE.

Witnesses:
 JAMES H. BELL,
 E. L. FULLERTON.